Patented June 28, 1938

2,121,808

UNITED STATES PATENT OFFICE 2,121,808

MANUFACTURE OF HIGH VISCOSITY CELLULOSE ESTERS

Carl J. Malm, Rochester, N. Y., assignor to Eastman Kodak Company, Rochester, N. Y., a corporation of New Jersey No Drawing. Application July 14, 1937, Serial No. 153,638

11 Claims. (Cl. 260—101)

The present invention relates to a method of preparing an esterification vessel for the making of a high viscosity organic acid ester of cellulose after it has been employed for a previous esterification.

In the making of organic acid esters of cellulose by a dope esterification it is impossible to remove all of the finished reaction mixture by pouring it from the esterification vessel, due to its viscous nature. The amount of reaction mixture or dope which remains is ordinarily approximately 25–50 lbs. for a mixer holding a 600 gal. batch. If the mixer is washed out with water, the cellulose ester, which is present in the dope, is precipitated and interferes with the cleaning of the mixer. Also, in that case the acetic acid, which is present in the dope, is thereby diluted and must be either reconcentrated or, if too dilute to make reconcentration economical, must be discarded. After the washing, it is preferable to dry the mixer, which further adds to the difficulty and expense of preparing the mixer for a subsequent esterification in this manner.

As the dope, which adheres to the sides of the vessel, contains sulfuric acid catalyst, it is desirable that some means be employed to overcome its effect before commencing the next batch. In the making of high viscosity cellulose esters, such as cellulose acetate, cellulose acetate propionate or acetate butyrate, it is desirable to presoak the cellulose with a bath from which catalyst is absent but which contains a considerable amount of acetic acid prior to the esterification to render the cellulose susceptible to the esterification and thereby avoid the degradation which occurs in a slowly reacting esterification mass. If this presoaking were carried out in the presence of sulfuric acid, such as would be present from the preceding esterification mixture which could not be removed from the vessel, the viscosity of the cellulose would be affected, thereby preventing the obtaining of a high viscosity ester therefrom. If an excess of a salt, such as sodium acetate or sodium carbonate, is added to neutralize this catalyst, these salts buffer the catalyst in the esterification proper, thereby slowing up the esterification and exposing the cellulose to the danger of degradation before sufficient acyl groups combine therewith to protect it.

One object of my invention is to avoid the expense and trouble involved in cleaning an esterification vessel before a subsequent esterification occurs. Another object of my invention is to provide a method of overcoming the effect of the catalyst which may be present without causing a buffering of the esterification which follows. Other objects of my invention will appear herein.

I have found that the danger of degradation of the cellulose because of this residual catalyst can be overcome if the amount of catalyst, which is present in the esterification mixer, is determined and the proper amount of an alkali metal salt is added to obtain a pH of 0.5–1.5 in the activating liquid prior to introducing the cellulose therein. This method is carried out by adding some of the activating acid to the esterification vessel and thoroughly mixing to obtain a solution of all the sulfuric acid therein after which a sample of this liquid is titrated to determine the amount of alkali metal salt which it is necessary to employ.

Examples of processes in which my invention is useful are those described in my Patent No. 2,026,986 of January 7, 1936. My invention, however, includes both processes of making the mixed esters of cellulose and cellulose acetate. Ordinarily after the esterification is completed, the dope is removed from the mixer or esterification vessel into a vessel wherein the hydrolysis can take place. When this dumping occurs, a considerable amount of the esterification mixture cannot be removed and, therefore, remains in the following mixture. My invention is also applicable, however, to cases where the hydrolysis has been carried out in the esterification vessel, as after the removal of the dope there is still a residual portion adhering to the walls of the vessel.

After the dope has apparently all been removed from the mixer, some or all of the lower fatty acid, which is to be used for the activation of the cellulose, is added to the esterification vessel. After thoroughly stirring the mass for about 10 min., a measured sample thereof is removed and titrated with a standard glacial acetic acid solution of a base such as guanidine acetate, pyridine or aniline, using methyl violet as indicator. The methyl violet has a yellow coloration in a strongly acid solution. As the acetic acid solution of the base is added thereto a transition toward green is observed when a pH of 0.5 is reached. One is thereby able to determine the exact amount of alkali metal salt necessary to obtain a pretreating solution having a pH of 0.5–1.5. When the calculated amount of sodium acetate or other like salts to obtain a pH of approximately 1 is added, the cellulose is then added and becomes activated without the necessity of employing a clean vessel. This activation is ordinarily satisfactory if carried out at about 100° F. for approximately 4 hours. The esterification mixture is then added and the reaction proceeds nicely without any buffering from the addition of excess salt.

For example, after an esterification of cellulose such as described in my Patent No. 2,026,986 in which process the completed reaction mixture was poured from the esterification vessel, 200 lbs. of glacial acetic acid were added to the vessel and the stirrers were run for a short time, such as about 10 min., to assure dissolving of all the dope including that attached to the walls of the mixer. A measured sample of the acid was then taken and titrated with a normal solution of guanidine acetate in acetic acid, using methyl violet as the indicator. From this titration, it was found that approximately 100 grams of sodium acetate would give a pH of approximately 1 in the activating liquid. This amount of sodium acetate was incorporated in the remainder of the activating liquid and the whole was added to the mixer. The cellulose was then added and the activation and esterification was then carried out in the usual manner such as by a process described in my Patent No. 2,026,986. Instead of making the mixed ester, my invention is also adapted to the process of making high viscosity cellulose acetate. In that case the presoaking is with acetic acid alone, whereas the presoaking in the making of a mixed ester may be either with acetic acid or with a mixture of acetic and propionic or acetic and butyric acid. The esterification is carried out with an appreciable amount of catalyst, such as about 7200 cc. of sulfuric acid for 450 lbs. of cellulose, to assure a rapid esterification and thereby avoid excessive degradation of the cellulose. In the making of the high viscosity esters the temperature is not allowed to rise to a maximum of more than 90° F. and preferably not more than 80° F. Also, the proportion of liquid to cellulose is 8 or more parts to every part of cellulose.

In carrying out my invention methyl violet is employed, as the indicator, due to its change of color being in the pH range in the vicinity of that with which my invention is concerned. In an acid bath having a pH below .5 this indicator is yellow and begins to take on a greenish cast just about at the point where the pH becomes .5. As the pH increases, the solution becomes green and finally bluish green above 1 becoming blue before a pH of 2 is reached. Therefore, for the purposes of my invention, the amount of alkali metal salt, which should be added, is indicated by a green coloration of the methyl violet, preferably at a point where the indicator is a distinct green, this being in the neighborhood of a pH of about 1. Instead of using an indicator, the pH can be determined by an electrometric titration and thereby the amount of sodium acetate or is equivalent, which should be added to the activating bath, can be determined. Any other indicator, which can be employed to show the amount of salt which will give a pH of 1 or thereabouts in the activating liquid, can be used, although, due to the color changes exhibited by methyl violet, this indicator has been found to be very suitable.

Instead of sodium acetate, chemically equivalent amounts of other alkali metal salts of weak acids, such as sodium carbonate, sodium bicarbonate, sodium borate, sodium sulfite or the like, might be employed. Instead of the salt, the hydroxide might be employed which, of course, would form a salt when put into the activating liquid. Included in the term "alkali metal" are not only the sodium, potassium and lithium salts and hydroxides but, also, those of ammonium or the strongly basic amines.

The high viscosity acyl cellulose esters may be regarded as those having an acetic acid-tetrachlorethane viscosity of at least 100 secs. and it is to the making of these esters that my invention is particularly directed. My invention will, however, also be useful in processes for making acyl cellulose esters where it is desirable that the cellulose be activated and yet a pronounced reduction of the viscosity of the cellulose in the activation is not wanted. Obviously in order to make a high viscosity cellulose ester it is necessary that the cellulose to be esterified should have a relatively high cuprammonium viscosity indicating little, if any, degradation of the cellulose in its refining in preparation for its use in the process of preparing cellulose esters.

I claim:

1. A method of preparing a used acylation vessel, containing as a residue some of the reaction mixture prepared therein, for a subsequent acylation of cellulose which comprises adding an alkali metal compound of basic tendencies to the activating liquid to be used in the pretreatment of the cellulose in the vessel in an amount to assure a pH of 0.5–1.5 prior to introducing the cellulose therein.

2. A method of preparing a used acylation vessel, containing as a residue some of the reaction mixture prepared therein, for a subsequent acylation of cellulose which comprises adding an alkali metal salt of a weak acid to the activating liquid to be used in the pretreatment of the cellulose in the vessel in an amount to assure a pH of 0.5–1.5 prior to introducing the cellulose therein.

3. A method of preparing a used acylation vessel, containing as a residue some of the reaction mixture prepared therein, for a subsequent acylation of cellulose which comprises adding an alkali metal compound of basic tendencies to the activating liquid to be used in the pretreatment of the cellulose in the vessel in an amount to assure a pH of approximately 0.5–1.5 prior to introducing the cellulose therein.

4. A method for preparing a used acylation vessel, containing as a residue some of the reaction mixture prepared therein, for a subsequent acylation of cellulose which comprises adding some of the activating liquid to the vessel, titrating a measured sample with an acetic acid solution of a base using methyl violet as the indicator until a green coloration is reached and then adding an amount of alkali metal salt of a weak acid to the activating liquid in the vessel to obtain a corresponding hydrogen ion concentration therein prior to the activation of the cellulose to be esterified.

5. A method of preparing a used acylation vessel, containing as a residue some of the reaction mixture prepared therein, for a subsequent acylation of cellulose which comprises adding an alkali metal acetate to the activating liquid to be used in the pretreatment of the cellulose in the vessel in an amount to assure a pH of 0.5–1.5 prior to introducing the cellulose therein.

6. A method of preparing a used acylation vessel, containing as a residue some of the reaction mixture prepared therein, for a subsequent acylation of cellulose which comprises adding a sodium acetate to the activating liquid to be used in the pretreatment of the cellulose in the vessel in an amount to assure a pH of 0.5–1.5 prior to introducing the cellulose therein.

7. A method of preparing a used acylation vessel, containing as a residue some of the reaction mixture prepared therein, for a subsequent acylation of cellulose which comprises adding an alkali metal carbonate to the activating liquid to be used in the pretreatment of the cellulose in the vessel in an amount to assure a pH of 0.5–1.5 prior to introducing the cellulose therein.

8. A method for preparing a used acylation vessel, containing as a residue some of the reaction mixture prepared therein, for a subsequent preparation of a high viscosity cellulose acylate which comprises adding an alkali metal compound of basic tendencies to the activating liquid in the vessel in an amount to assure a pH of 0.5–1.5 prior to the pretreatment of the cellulose therein.

9. A method for preparing an acylation vessel, containing as a residue some of the previous acetylation mixture prepared therein, for the subsequent acetylation of cellulose which comprises putting acetic acid in the vessel, adding an alkali metal compound of basic tendencies thereto in an amount to assure a pH of 0.5–1.5 prior to activating the cellulose therewith.

10. A method for preparing a high viscosity acetyl cellulose in a used acetylation vessel which contains some of the previous acetylation batch, which comprises mixing an amount of sodium acetate with the activating liquid to assure a pH of 0.5–1.5 in the vessel, pretreating a cellulose having a high cuprammonium viscosity therein and then acetylating the cellulose with a bath of at least 8 parts of liquid to 1 of cellulose at a temperature not to exceed 90° F.

11. A method for preparing an acylation vessel, containing as a residue some of the previous acetylation mixture prepared therein, for the subsequent acetylation of cellulose which comprises putting in the vessel acetic acid containing an alkali metal compound of basic tendencies in an amount to assure a pH of 0.5–1.5 prior to activating the cellulose therewith.

CARL J. MALM.